United States Patent
Guo et al.

(10) Patent No.: US 10,050,472 B2
(45) Date of Patent: Aug. 14, 2018

(54) CONTROL METHOD AND DEVICE FOR WIRELESS POWER TRANSFER SYSTEM OF MOTOR DEVICE

(71) Applicant: ZTE CORPORATION, Shenzhen, Guangdong Province (CN)

(72) Inventors: Cheng Guo, Shenzhen (CN); Feiyun Tang, Shenzhen (CN); Jie Fan, Shenzhen (CN); Yong Luo, Shenzhen (CN); Jianping Zhou, Shenzhen (CN); Chuan He, Shenzhen (CN); Chen Liu, Shenzhen (CN); Yaoguang Gao, Shenzhen (CN); Wei Liu, Shenzhen (CN); Beibei Qiu, Shenzhen (CN); Jing Wang, Shenzhen (CN); Jianquan Liu, Shenzhen (CN); Lin Chi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 169 days.

(21) Appl. No.: 15/024,349

(22) PCT Filed: Jun. 19, 2014

(86) PCT No.: PCT/CN2014/080328
§ 371 (c)(1),
(2) Date: Mar. 23, 2016

(87) PCT Pub. No.: WO2015/043250
PCT Pub. Date: Apr. 2, 2015

(65) Prior Publication Data
US 2016/0241084 A1 Aug. 18, 2016

(30) Foreign Application Priority Data
Sep. 27, 2013 (CN) .......................... 2013 1 0451424

(51) Int. Cl.
*H04Q 5/22* (2006.01)
*B60L 11/18* (2006.01)
(Continued)

(52) U.S. Cl.
CPC .............. *H02J 50/10* (2016.02); *B60L 11/182* (2013.01); *B60L 11/1803* (2013.01);
(Continued)

(58) Field of Classification Search
CPC ......... H60L 11/182; H02J 50/10; H02J 50/90; H02J 7/025; H01F 38/14
(Continued)

(56) References Cited

U.S. PATENT DOCUMENTS 8,415,885 B2 * 4/2013 Yamazawa ........ H01J 37/32174
156/345.48
9,036,371 B2 * 5/2015 Baarman .................... A61L 2/10
363/16
(Continued)

FOREIGN PATENT DOCUMENTS

CN 103036282 A 4/2013
CN 202957642 U 5/2013
(Continued)

OTHER PUBLICATIONS

International Search Report and Written Opinion dated Sep. 26, 2014 in PCT Patent Application No. PCT/CN2014/080328.
(Continued)

*Primary Examiner* — Dinh T Le
(74) *Attorney, Agent, or Firm* — Plumsea Law Group, LLC

(57) ABSTRACT

A controlling method and device for a wireless power transfer system, wherein the wireless power transfer system includes a transmitting component and a receiving component, and further includes a contactless transformer & com-
(Continued)

pensation (CT&C) circuit, and the controlling method includes: obtaining positional relationship information of the transmitting component and the receiving component; adjusting the number of coil turns of the transmitting component based on the positional relationship information, and making conditions of a CT&C voltage gain characteristic and an input impedance characteristic after a charging inverter bridge of the wireless power transfer system meet a charging condition. The abovementioned technical solution can provide a protection for a stable operation of the wireless power transfer system with a non-mechanical adjusting device, and the wireless charging can be achieved without using a mechanical adjusting device to align and range.

13 Claims, 4 Drawing Sheets

(51) Int. Cl.
*H02J 50/10* (2016.01)
*H02J 50/12* (2016.01)
*H02J 17/00* (2006.01)
*H02J 7/02* (2016.01)
*H02J 50/90* (2016.01)

(52) U.S. Cl.
CPC .......... *B60L 11/1831* (2013.01); *H02J 7/025* (2013.01); *H02J 17/00* (2013.01); *H02J 50/12* (2016.02); *H02J 50/90* (2016.02); *B60L 2210/10* (2013.01); *B60L 2210/40* (2013.01); *B60L 2230/16* (2013.01); *Y02T 10/7005* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01)

(58) Field of Classification Search
USPC .......................................................... 307/104
See application file for complete search history.

(56) References Cited

U.S. PATENT DOCUMENTS

| | | | | |
|---|---|---|---|---|
| 9,601,941 | B2* | 3/2017 | Cheikh | .................... H02J 7/007 |
| 2011/0233170 | A1* | 9/2011 | Yamazawa | ............ H01J 37/321 |
| | | | | 216/67 |
| 2013/0038281 | A1 | 2/2013 | Sakakibara et al. | |
| 2013/0221913 | A1 | 8/2013 | Kim | |
| 2013/0313912 | A1* | 11/2013 | Abe | ........................ H02J 5/005 |
| | | | | 307/104 |

FOREIGN PATENT DOCUMENTS

| | | |
|---|---|---|
| CN | 103259297 A | 8/2013 |
| EP | 2568571 A1 | 3/2013 |
| JP | 2010252497 A | 11/2010 |
| JP | 2012110157 A | 6/2012 |
| JP | 2012175793 A | 9/2012 |
| JP | 2012196031 A | 10/2012 |
| WO | 2012108432 A1 | 8/2012 |
| WO | 2012160660 A1 | 11/2012 |

OTHER PUBLICATIONS

European Search Report dated Aug. 29, 2016 in EP Application No. EP14849305.9.
Japanese Office Action dated Mar. 21, 2017 for Japanese Application No. 2016-516896.
"Proposal and Experimental Study of Position Sensor Based on Magnetic Resonance Coupling," Nakamura, et al., vol. 48, No. 9, Sep. 2012 (10pp).
Communication pursuant to Article 94(3) EPC dated Dec. 11, 2017 for European Patent Application No. 4849305.9.

* cited by examiner

CONTROL METHOD AND DEVICE FOR WIRELESS POWER TRANSFER SYSTEM OF MOTOR DEVICE

CROSS-REFERENCE TO RELATED APPLICATION(S)

This application is the U.S. National Phase application of PCT application number PCT/CN2014/080328 having a PCT filing date of Jun. 19, 2014, which claims priority of Chinese patent application 201310451424.5 filed on Sep. 27, 2013, the disclosures of which are hereby incorporated by reference.

TECHNICAL FIELD

The present application relates to technologies for controlling a wireless power transfer system of an electric device, and more particularly, to a controlling method and device for a wireless power transfer system of an electric device.

BACKGROUND OF RELATED ART

With the constant development of the wireless charging technology, using the wireless charging system to provide power for electric devices becomes a development direction of electric device charging, with respect to the wired charging ways, the wireless charging has significant advantages.

FIG. 1 is a schematic diagram of the basic structure of a Wireless Power Transfer (WPT) system, as shown in FIG. 1, the system comprises: a Power Transmit & Control circuit (PT&C), a contactless transformer & compensation circuit (CT&C), a power Pickup & control circuit (PP&C). Wherein, the PT&C comprises: a power factor controller and a full-bridge inverter, wherein the full-bridge inverter using a soft switch of the inverter bridge has a requirement of input impedance characteristic after the inverter bridge on the system which includes the CT&C after CT&C is performed; the CT&C comprises: a transmitting coil and a receiving coil; wherein the transmitting coil consists of a magnetic core, a coil 1 and a capacitor C1 connected in series, and the receiving coil consists of a magnetic core, a coil 2 and a capacitor C2 connected in parallel; the PP&C comprises: a rectifier and a DC-DC converter. When the wireless power transfer system is used to wirelessly charge an electric device, usually the transmitting coil of the CT&C is placed on the ground or underground, while the receiving coil is mounted under the electric device body.

When using a wireless power transfer system to charge an electric device, its transmitting coil and receiving coil need to meet a certain positional relationship to ensure a stable and efficient operation of the system. Taking an electric vehicle as an example, FIG. 2 is a diagram of a positional relationship of the transmitting coil and the receiving coil, as shown in FIG. 2, in an actual implementation process, due to driver skill differences and electric vehicle body differences, when an electric vehicle parks and is being charged, the X-axis offset a, the Y-axis offset b and the Z-axis offset c of the receiving coil 1 and the transmitting coil 2 under the vehicle body cannot guarantee that they meet the positional relationship of the input impedance characteristic after the inverter bridge and the CT&C voltage gain characteristic required by wireless charging. In order to achieve normal charging of the wireless power transfer system, currently a position detecting system and a mechanical adjusting device are used, that is, each wireless power transfer system is provided with a position detecting system and a mechanical adjusting device for adjusting the height and coordination of the transmitting coil, wherein, the position detecting system is used for determining the positional relationship between the transmitting coil and the receiving coil, and the mechanical adjusting device is used for adjusting the positional relationship of the transmitting coil and the receiving coil to meet the wireless charging requirement.

In the wireless charging process, if a traditional mechanical adjusting device is used in a long term, the maintenance is difficult when it fails. If the mechanical adjusting device is provided at the position of the vehicle body adjustment receiving coil, the maintenance problem is still not negligible; and more expenses need to be added for the industrial design of the vehicle body.

Through the abovementioned description, it can be found that, when using the wireless power transfer system to wirelessly charge an electric device, the wireless power transfer system achieves the position adjustment of a transmitting coil through a long-term use of the mechanical adjusting device, which has the problem that the maintenance is difficult.

SUMMARY

To solve the technical problem, the embodiment of the present document is to provide a controlling method for a wireless power transfer system, to provide a protection for a stable operation of a wireless power transfer system through a non-mechanical adjusting device, and to achieve wireless charging without using a mechanical adjusting device to align and range.

To achieve the object of the present document, the following technical solution will be used:

a controlling method for a wireless power transfer system, wherein the wireless power transfer system comprises a transmitting coil and a receiving coil, and further comprises a contactless transformer & compensation circuit (CT&C), and the controlling method comprises:

obtaining positional relationship information of the transmitting coil and the receiving coil;

adjusting a number of coil turns of the transmitting coil based on the positional relationship information, and making conditions of a CT&C voltage gain characteristic and an input impedance characteristic after a charging inverter bridge of the wireless power transfer system meet a charging condition.

Alternatively, coils of both the transmitting coil and the receiving coil use a planar distributed winding arrangement, the winding is divided into two segments that are respectively wound and connected in series along a single path, and a sum of numbers of turns of the two segments is a total number of coil turns of the transmitting coil or the receiving coil.

Alternatively, the step of making conditions of a CT&C voltage gain characteristic and an input impedance characteristic after a charging inverter bridge of the wireless power transfer system meet a charging condition comprises:

reducing an input impedance angle after the charging inverter bridge of the wireless power transfer system to be zero, and making the CT&C voltage gain equal to a given gain.

Alternatively, before obtaining positional relationship information of the transmitting coil and the receiving coil, the method further comprises:

generating a mapping relationship between the number of coil turns of the transmitting coil and the positional relationship information of the transmitting coil and the receiving coil, and generating a mapping relationship table.

Alternatively, the step of adjusting a number of coil turns of the transmitting coil based on the positional relationship information comprises:

judging whether the mapping relationship comprises the positional relationship information, if not comprising, gradually shorting the coil from outermost of the coil of the transmitting coil, and every time one turn of the coil is shorted, judging whether the conditions of the CT&C voltage gain characteristic and the input impedance characteristic after the charging inverter bridge of the wireless power transfer system meet the charging condition, and if the charging condition is met, completing the adjustment;

recording the positional relationship information and a number of coil turns of the transmitting coil corresponding to the positional relationship information into the mapping relationship table.

Alternatively, the adjusted number of coil turns of the transmitting coil makes a difference of the numbers of the coil turns of the two segments be 0 or 1.

Alternatively, the method further comprises:

if it is judged that the mapping relationship comprises the positional relationship information, and the number of coil turns of the transmitting coil corresponding to the obtained position relationship information can make the wireless power transfer system charge normally, directly adjusting the number of coil turns of the transmitting coil to be the number of coil turns of the transmitting coil corresponding to the positional relationship information based on the mapping relationship;

if a mapping data device comprises the obtained positional relationship information, but the number of coil turns of the transmitting coil corresponding to the obtained positional relationship information can not make the wireless power transfer system charge normally, giving up the charging.

A controlling device for a wireless power transfer system, wherein the wireless power transfer system comprises a transmitting coil and a receiving coil, and further comprises a contactless transformer & compensation circuit (CT&C), and the controlling device comprises: an auxiliary positioning device and a turn number adjusting device, wherein:

the auxiliary positioning device is configured to: determine a position of the receiving coil, obtain positional relationship information of the transmitting coil and the receiving coil, and sending the positional relationship information to the turn number adjusting device;

the turn number adjusting device is configured to: receive the positional relationship information, adjust a number of coil turns of the transmitting coil based on the positional relationship information, and make conditions of a CT&C voltage gain characteristic and an input impedance characteristic after a charging inverter bridge of the wireless power transfer system meet a charging condition.

Alternatively, the turn number adjusting device is provided at a ray that takes a midpoint of a coil plane as a starting point.

Alternatively, coils of the transmitting coil and the receiving coil use a planar distributed winding arrangement, the winding is divided into two segments that are respectively wound and connected in series consequently, and a sum of numbers of turns of the two segments is a total number of turns of the transmitting coil or the receiving component.

Alternatively, the step of making conditions of a CT&C voltage gain characteristic and an input impedance characteristic after the charging inverter bridge of the wireless power transfer system meet a charging condition comprises:

reducing an input impedance angle after the charging inverter bridge of the wireless power transfer system to be zero, and making the CT&C voltage gain equal to a given gain.

Alternatively, the device further comprises a mapping data device, wherein:

the mapping data device is configured to: generate a mapping relationship between the number of coil turns of the transmitting coil and the positional relationship information of the transmitting coil and the receiving component, and generate a mapping relationship table.

Alternatively, the turn number adjusting device is configured to adjust the number of coil turns of the transmitting component based on the positional relationship information in the following manner:

judging whether the mapping data device comprises the positional relationship information, if comprising, gradually shorting the coil from outermost of the coil of the transmitting coil, and every time one turn of the coil is shorted, judging whether the conditions of the CT&C voltage gain characteristic and the input impedance characteristic after the charging inverter bridge of the wireless power transfer system meet the charging condition, and if the charging condition is met, completing the adjustment;

recording the positional relationship information and a number of coil turns of the transmitting coil corresponding to the positional relationship information into the mapping relationship table.

Alternatively, the adjusted number of coil turns of the transmitting coil makes a difference of the numbers of coil turns of the two segments be 0 or 1.

Alternatively, the turn number adjusting device is further configured to:

if it is judged that the mapping relationship comprises the positional relationship information and the number of coil turns of the transmitting coil corresponding to the obtained position relationship information can make the wireless power transfer system charge normally, directly adjust the number of coil turns of the transmitting coil to be the number of coil turns of the transmitting coil corresponding to the positional relationship information based on the mapping relationship;

if the mapping data device comprises the obtained positional relationship information, but the number of coil turns of the transmitting coil corresponding to the obtained positional relationship information cannot make the wireless power transfer system charge normally, give up the charging.

In addition, the abovementioned technical solution generates a mapping relationship between the positional relationship information and the number of coil turns of the transmitting component, when the positional relationship information is data existing in the mapping information, it is to directly load the number of coil turns when the charging condition is met; and to give up the charging when the charging condition is not met; when the positional relationship information does not exist, the number of coil turns is adjusted based on the method according to the embodiment of the present document, and the mapping information is updated, thus saving the time for adjusting the coil in the charging process and improving the system efficiency.

BRIEF DESCRIPTION OF THE DRAWINGS

The accompanying drawings are used to provide a further understanding of the technical solution of the present application, and constitute a part of the specification, together with the embodiments of the present application, they are used to explain the technical solution of the present application, and do not constitute a limitation of the technical solution of the present application.

PREFERRED EMBODIMENTS OF THE INVENTION

Figure 1:
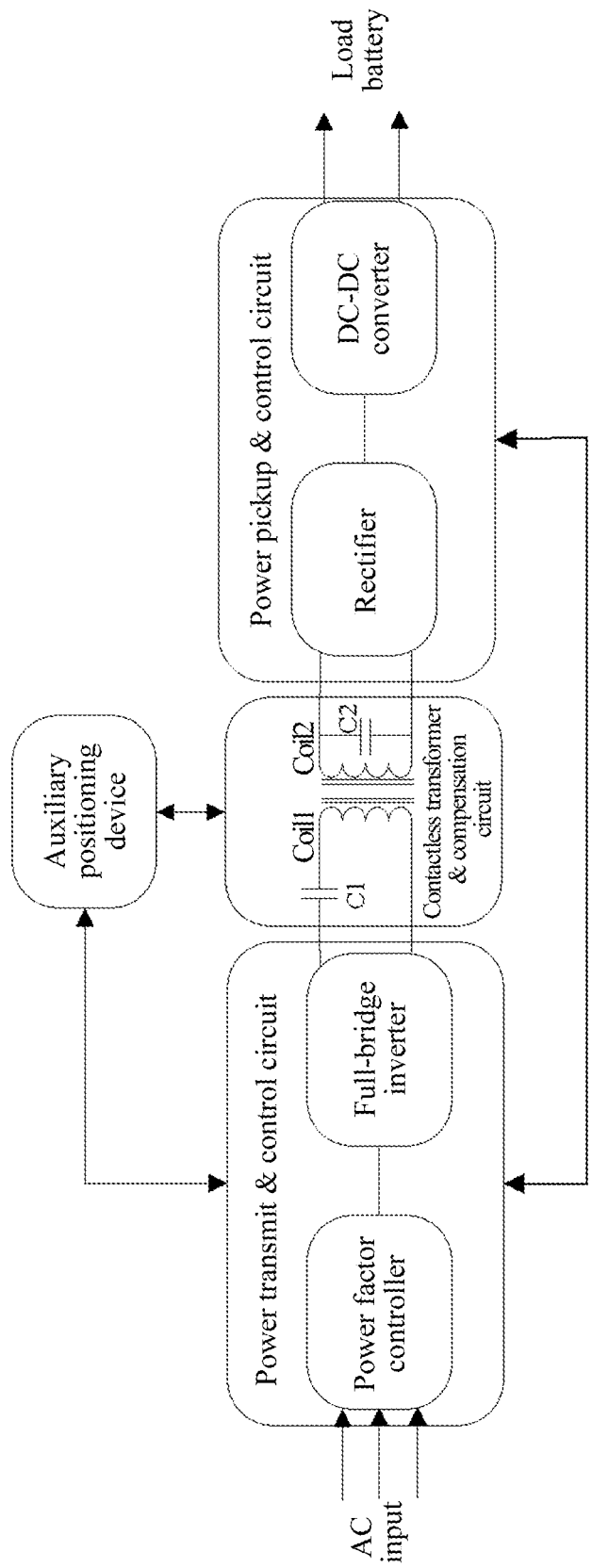
FIG. 1 is a basic block diagram of a wireless power transfer system (WPT) in the related art.
Figure 2:
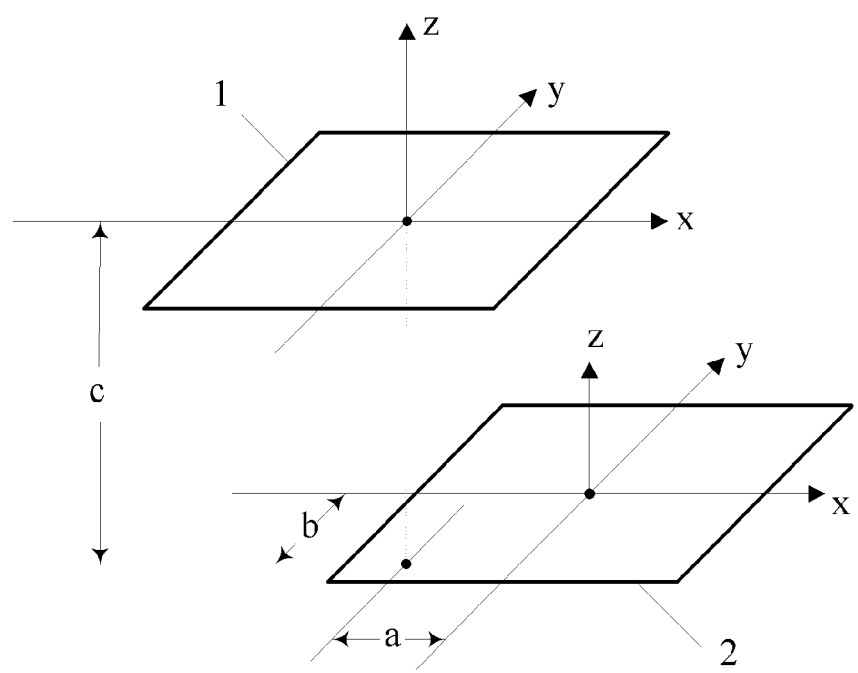
FIG. 2 is a schematic diagram of a positional relationship of a transmitting coil and a receiving coil in the related art.

Hereinafter, in conjunction with the accompanying drawings, the embodiments of the present application will be described in detail. It should be noted that, in the case of no conflict, embodiments and features in the embodiments of the present application may be arbitrarily combined with each other.

The embodiment of the present document provides a controlling method for a wireless power transfer system, comprising: obtaining positional relationship information of a transmitting component and a receiving component;

adjusting the number of coil turns of the transmitting coil based on the positional relationship information, and making the system meet the conditions of the input impedance characteristic after the charging inverter bridge and the CT&C voltage gain characteristic.

Alternatively, the coils of the transmitting coil and the receiving coil use a planar distributed winding arrangement, the winding is divided into two segments that are respectively wound and connected in series consequently, and a sum of the numbers of turns of the two segments is the total number of turns of the transmitting coil or the receiving coil.

Alternatively, before that, the method further comprises: generating a mapping relationship between the positional relationship information and the number of coil turns of the transmitting coil.

Alternatively, said adjusting the number of coil turns of the transmitting coil comprises: judging whether the obtained positional relationship information exists in the mapping relationship, if not existing, gradually shorting the coil from the outermost of the coil of the transmitting coil, and every time one turn of the coil is shorted, judging whether the CT&C voltage gain characteristic and the input impedance characteristic after the charging inverter bridge of the system meet the charging condition, and if meeting, completing the adjustment;

updating the mapping relationship.

Alternatively, the adjusted number of coil turns of the transmitting coil makes a difference of the numbers of coil turns of the two segments be 0 or 1.

Alternatively, if it is judged that the positional relationship information exists in the mapping relationship, the method further comprises:

if the adjusted number of coil turns of the transmitting coil in the mapping relationship meets the charging position relationship, directly loading the number of coil turns;

if the adjusted number of coil turns of the transmitting coil in the mapping relationship does not meet the charging position relationship, giving up the charging.

On the other hand, the present document further provides a controlling device for a wireless power transfer system of an electric vehicle, comprising:

an auxiliary positioning device, used to determine a position of the receiving coil, obtain positional relationship information of the transmitting coil and the receiving coil, and send the information to a turn number adjusting device;

the turn number adjusting device, used to: receive the positional relationship information of the transmitting coil and the receiving coil, adjust the number of coil turns of the transmitting component, and make it meet the conditions of the input impedance characteristic after the charging inverter bridge and the CT&C voltage gain characteristic required by the charging condition.

Alternatively, the turn number adjusting device is provided at a ray that takes a midpoint of a coil plane as a starting point.

Alternatively, the coils of the transmitting coil and the receiving coil use the planar distributed winding arrangement, the winding is divided into two segments that are respectively wound and connected in series consequently, and a sum of numbers of turns of the two segments is the total number of turns of the transmitting coil or the receiving coil.

Alternatively, the device further comprises a mapping data device, used to: generate a mapping relationship between the positional relationship information and the number of coil turns of the transmitting coil.

Alternatively, said adjusting the number of coil turns of the transmitting coil comprises: judging whether the obtained positional relationship information exists in the mapping data device, if not existing, gradually shorting the coil from the outermost of the coil of the transmitting coil, and every time one turn of the coil is shorted, judging whether the input impedance characteristic after its inverter bridge and the CT&C voltage gain characteristic meet the system charging condition, and if meeting, completing the adjustment;

updating the mapping relationship.

Alternatively, the adjusted number of coil turns of the transmitting coil makes the difference of the numbers of coil turns of the two segments be 0 or 1.

Alternatively, if it is judged that the obtained positional relationship information exists in the mapping data device, the device is further used to: if the adjust number of coil turns of the transmitting coil in the mapping data device meets the charging position relationship, directly load the number of coil turns;

if the adjust number of coil turns of the transmitting coil in the mapping data device does not meet the charging position relationship, give up the charging.

The controlling method for a wireless power transfer system of an electric vehicle according to the abovementioned technical solution comprises: obtaining positional relationship information of a transmitting component and a receiving component; adjusting the number of coil turns of the transmitting component based on the positional relationship information, and making the system meet the conditions of the input impedance characteristic after the charging inverter bridge and the CT&C voltage gain characteristic. With the method according to the embodiment of the present document, a control output meeting the charging condition can be achieved just by gradually adjusting the number of coil turns, and the wireless charging can be implemented without using a mechanical adjusting device to align and range.

In the wireless charging process of the wireless power transfer system, in the related art, the transmitting coil of the system is selected as the series capacitor of the transmitting coil, and the receiving component is the parallel capacitor of the receiving coil, in the case that other conditions in the system remain are unchanged, shorting the number of coil turns of the transmitting coil makes the voltage gain become larger, and the input impedance angle after the full-bridge inverter becomes larger with the change rate of frequency, therefore the wireless charging should be performed, and it needs to adjust the number of coil turns to meet the requirements of the input impedance characteristic after the inverter bridge and the CT&C voltage gain characteristic for the system to charge.

Figure 3:
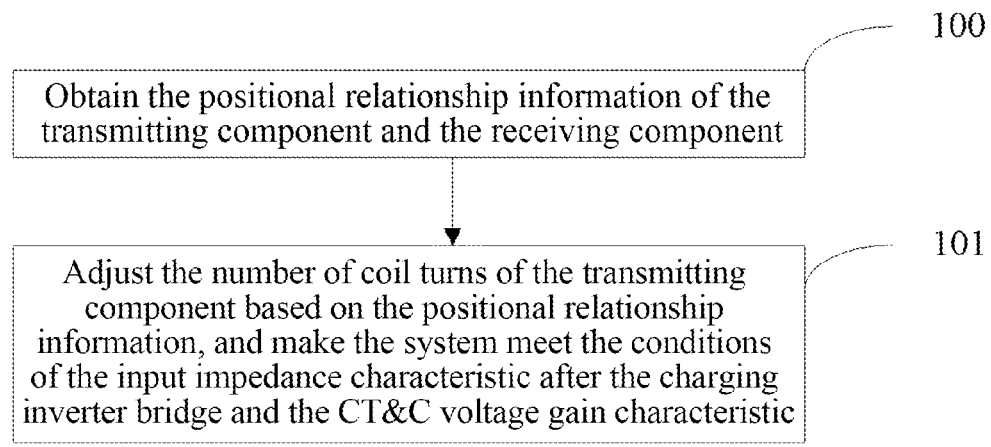
FIG. 3 is a flow chart of a controlling method for a wireless power transfer system in accordance with an embodiment of the present document.

FIG. 3 is a flow chart of the controlling method for a wireless power transfer system in accordance with an embodiment of the present document, as shown in FIG. 3, the controlling method for the wireless power transfer system of an electric device comprises:

in step 100, it is to obtain the positional relationship information of the transmitting coil and the receiving coil;

the positional relationship information is determined based on the X-axis offset a, the Y-axis offset b, and the Z-axis offset c of the transmitting component and the receiving coil, wherein the way for obtaining the offsets can be implemented through wireless ranging, laser ranging, and video ranging.

Before this step, the method in accordance with the embodiment of the present document further comprises: generating a mapping relationship between the number of coil turns of the transmitting component and the positional relationship information of the transmitting component and the receiving component.

It should be noted that, the way for generating a mapping relationship between the number of coil turns of the transmitting coil and the positional relationship information of the transmitting coil and the receiving coil is: when the electric device needs to be charged, the wireless power transfer system needs to provide the electric device with a DC-DC converter output required by the loading battery, the CT&C voltage gain characteristic and the input impedance characteristic after the inverter bridge of the wireless power transfer system will be different. When obtaining the positional relationship of the transmitting coil and the receiving coil, it needs to adjust the number of coil turns to meet the requirements of the input impedance characteristic after the inverter bridge and the CT&C voltage gain characteristic, for different positional relationship information, correspondingly in the process of gradually shorting the number of coil turns, its impedance angle and CT&T voltage gain continue to change until the CT&C voltage gain characteristic and the input impedance characteristic after the charging inverter bridge of the wireless power transfer system meet the charging condition, i.e. the input impedance angle after the inverter bridge is reduced to zero, and the CT&C voltage gain is equal to a given gain, the wireless power transfer system can be charged normally, at this time, the position relationship information and the number of coil turns form a mapping relationship.

In step 101, it is to adjust the number of coil turns of the transmitting coil based on the positional relationship information, and make conditions of the CT&C voltage gain characteristic and the input impedance characteristic after the charging inverter bridge of the wireless power transfer system meet the charging condition.

The conditions of the CT&C voltage gain characteristic and the input impedance characteristic after the charging inverter bridge of the wireless power transfer system meeting the charging condition refers to: the input impedance angle after the charging inverter bridge of the system is reduced to zero, and the CT&C voltage gain is equal to the given gain.

It should be noted that, said adjusting the number of coil turns of the transmitting coil is mainly determined according to the corresponding relationship between the change in the number of coil turns of the transmitting coil and the input impedance characteristic after the inverter bridge and the CT&C voltage gain characteristic, and by adjusting the number of coil turns of the transmitting coil, the input impedance angle meets the input impedance characteristic after the inverter bridge in the full-bridge inverter, and the CT&C voltage gain can meet the gain characteristic requirements in the input voltage range of the DC-DC converter in the system.

In this step, the coils of the transmitting coil and the receiving coil use the planar distributed coil winding arrangement, and the winding is divided into two segments that are wound respectively and connected in series along a single path, the sum of numbers of turns of these two segments is the total number of turns of the transmitting coil or the receiving coil. The adjusted number of coil turns of the transmitting coil makes the difference of the numbers of coil turns of the two segments be 0 or 1.

Said adjusting the number of coil turns of the transmitting coil comprises: judging whether the mapping relationship comprises the obtained positional relationship information, and if not comprising, adjusting the number of coil turns of the transmitting coil to make the system meet the input impedance characteristic after the charging inverter bridge and the CT&C voltage gain characteristic, that is, gradually shorting the coil from the outermost of the coil of the transmitting coil, and every time one turn of the coil is shorted, judging whether the input impedance characteristic after the system inverter bridge and the CT&C voltage gain characteristic meet the charging condition, and if meeting, completing the adjustment; and updating the mapping relationship after adjusting the number of coil turns.

The method according to the embodiment of the present document further comprises, if the mapping data device comprises the obtained positional relationship information, and the number of coil turns of the transmitting component corresponding to the obtained positional relationship information can make the system charge normally, directly adjusting the number of coil turns of the transmitting component to be the number of coil turns of the transmitting component corresponding to the positional relationship information based on the mapping relationship; if the mapping data device comprises the obtained positional relationship information, but the number of coil turns of the transmitting component corresponding to the obtained positional relationship information cannot make the system charge normally, then giving up the charging.

Alternatively, the electric device is an electric car.

Figure 4:
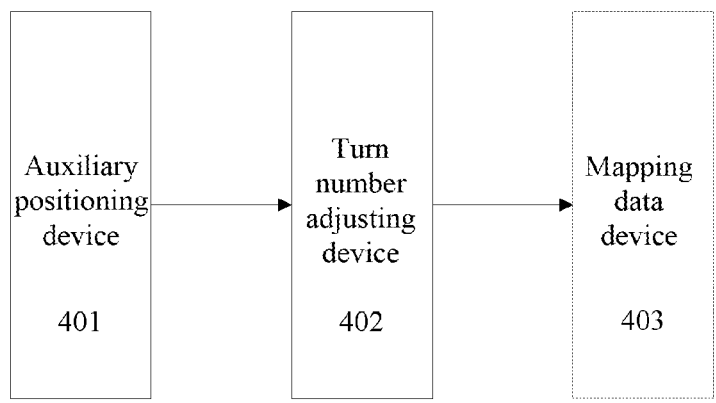
FIG. 4 is a block diagram of a controlling device for a wireless power transfer system in accordance with an embodiment of the present document.

FIG. 4 is a block diagram of the controlling device for a wireless power transfer system in accordance with an embodiment of the present document, as shown in FIG. 4, it comprises:

An auxiliary positioning device 401, configured to: determine the position of the receiving coil, obtain positional relationship information of the transmitting coil and the receiving coil, and send it to a turn number adjusting device, Wherein the positional relationship comprises: X-axis offset a, Y-axis offset b and Z-axis offset c;

the turn number adjusting device 402, configured to: receive the positional relationship of the transmitting coil and the receiving coil, adjust the number of coil turns of the transmitting coil, and make the positional relationship of the transmitting coil and the receiving coil meet the charging condition.

Figure 5:
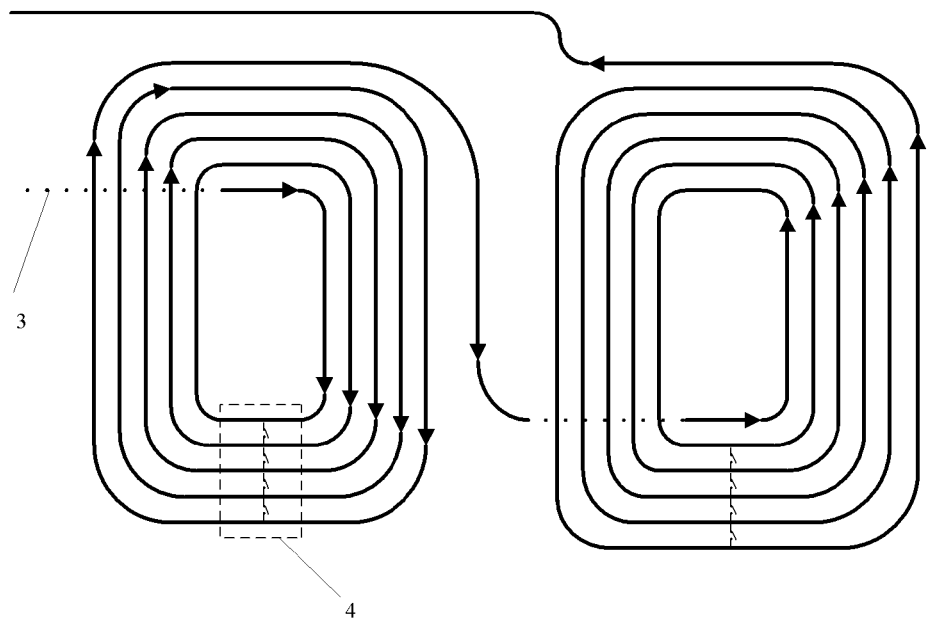
FIG. 5 is a schematic diagram of a coil winding arrangement of the controlling device for a wireless power transfer system in accordance with an embodiment of the present document.

FIG. 5 is a schematic diagram of the coil winding arrangement of the controlling device for the wireless power transfer system according to an embodiment of the present document, as shown in FIG. 5, the coils of the transmitting component and the receiving component use the planar distributed winding arrangement, and the winding is divided into two segments that are wounded respectively and connected in series consequently, and the sum of numbers of turns of the two segments is the total number of turns of the transmitting component or the receiving component.

The turn number adjusting device is provided at a ray that takes the midpoint of the coil plane as the starting point.

The way for adjusting the number of coil turns of the transmitting coil is: adjusting the number of coil turns of the transmitting coil, and making it meet the CT&C voltage gain characteristic and the input impedance characteristic after the charging inverter bridge of the power transfer system. In addition, the number of coil turns of the transmitting coil is adjusted to make the difference of the numbers of coil turns of the two segments be 0 or 1.

Figure 6:
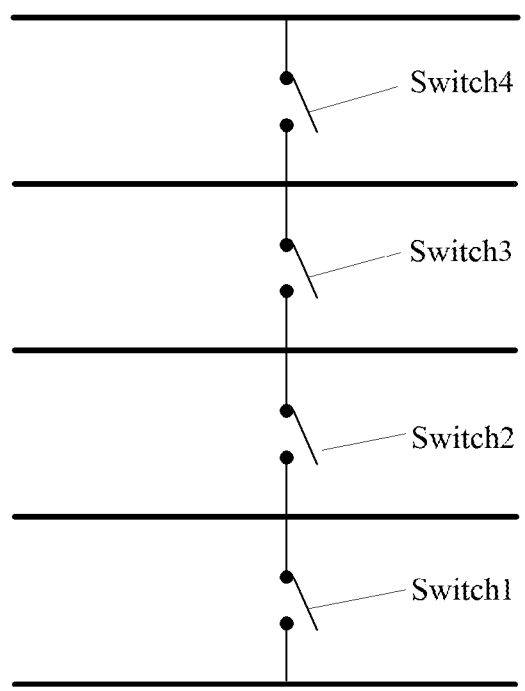
FIG. 6 is a schematic diagram when a turn number adjusting device of the controlling device for a wireless power transfer system is a switch-type device in accordance with an embodiment of the present document.

FIG. 6 is a schematic diagram when the turn number adjusting device of the controlling device for a wireless power transfer system according to the embodiment of the present document is a switching device, and in FIG. 6, the switching device is used to implement. And the switches 1, 2, 3 and 4 are used to gradually short the coil from the outermost.

The device according to the embodiment of the present document further comprises a mapping data device 403, configured to: generate mapping information of the positional relationship information and the number of coil turns.

Said adjusting the number of coil turns of the transmitting coil comprises: judging whether the mapping data device comprises the obtained positional relationship information, if not comprising, adjusting the number of coil turns of the transmitting coil to make the system meet the conditions of the input impedance characteristic after the charging inverter bridge and the CT&C voltage gain characteristic. It is to gradually reduce the number of coil turns from the outermost by using a switch or electronic component having the function of FIG. 6, and at each time of reducing one turn, judge whether the input impedance characteristic after the inverter bridge and the CT&C voltage gain characteristic meet the system charging condition, and if meeting, complete the adjustment.

When the number of coil turns of the transmitting coil is adjusted to meet the input impedance characteristic after the charging inverter bridge and the CT&C voltage gain characteristic, it is to update the mapping relationship information of the mapping data device.

The device is further used to: if the mapping data device comprises the obtained positional relationship information, and the number of coil turns of the transmitting coil corresponding to the obtained positional relationship information makes the system charge normally, directly adjust the number of coil turns of the transmitting coil to be the number of coil turns of the transmitting coil corresponding to the positional relationship information based on the mapping relationship; if the mapping data device comprises the obtained positional relationship information, but the number of coil turns of the transmitting coil corresponding to the obtained positional relationship information cannot make the system charge normally, then give up the charging.

Table 1 is a schematic diagram of data recorded by a storage matching device of the controlling device for the wireless power transfer system according to the embodiment of the present document. As shown in Table 1, when the position of the receiving component is data recorded in the storage matching unit, it is to directly set the number of coil turns for charging; it is also used for recording the position of the receiving component when the position of the receiving component cannot charge by adjusting the number of coil turns, and the charging will not be performed when the obtained position of the receiving component is data in the storage matching unit.

TABLE 1

| Z offset +2 | | | −2 | | | +4 | | | −4 | | |
|---|---|---|---|---|---|---|---|---|---|---|---|
| | X offset | | | X offset | | | X offset | | | X offset | |
| Y offset | 10% | 20% | Y offset | 10% | 20% | Y offset | 10% | 20% | Y offset | 10% | 20% |
| 10% | X1 | X2 | 10% | X7 | X8 | 10% | X13 | X14 | 10% | X18 | X19 |
| 20% | X3 | X4 | 20% | X9 | X10 | 20% | X15 | X16 | 20% | X20 | X21 |
| 30% | X5 | X6 | 30% | X11 | X12 | 30% | X17 | N | 30% | X22 | N |

It should be noted that the number of switches and the number of coils of the transmitting component in the wireless charging process can be designed according to appropriate requirements of the wireless charging process, while the switch controlling the number of coil turns is not necessarily the switch shown in FIG. 6, and an electronic component or chip having the switch shown in FIG. 6 should be within the protection scope of the present document.

Although the embodiments disclosed in the present application are as above, the content is only used to understand the embodiments used in the present application easily and is not intended to limit the present application. Any person skilled in the field of the present application can make any modifications and changes in forms and details of the implementation on the premise of without departing from the spirit and scope disclosed in the present application, but the protection scope of the present application is still subjected to the scope defined by the appended claims.

INDUSTRIAL APPLICABILITY

The method according to the embodiment of the present document can achieve a control output meeting the charging condition just by gradually adjusting the number of coil turns, and the wireless charging can be implemented without using a mechanical adjusting device to align and range. In addition, the abovementioned technical solution generates a mapping relationship between the positional relationship information and the number of coil turns of the transmitting component, when the positional relationship information is data existing in the mapping information, it is to directly load the number of coil turns when meeting the charging condition; and to give up the charging when the charging condition is not met; when the positional relationship information does not exist, it is to adjust the number of coil turns based on the method according to the embodiment of the present document, and update the mapping information, thus saving the time for adjusting the coil in the charging process and improving the system efficiency. Therefore, the present document has very strong industrial applicability.

What is claimed is:

1. A controlling method for a wireless power transfer system, wherein the wireless power transfer system comprises a transmitting coil and a receiving coil, and further comprises a contactless transformer & compensation circuit (CT&C), and the controlling method comprises:
    obtaining positional relationship information of transmitting coil and a receiving coil;
    adjusting a number of coil turns of the transmitting coil based on the positional relationship information, and adjusting conditions of a CT&C voltage gain and an input impedance after a charging inverter bridge of the wireless power transfer system to meet a charging condition so that the wireless power transfer system can charge an electric device;
    wherein before obtaining positional relationship information of the transmitting coil and the receiving coil, the method further comprises:
    generating a mapping relationship between the number of coil turns of the transmitting coil and the positional relationship information of the transmitting coil and the receiving coil, and generating a mapping relationship table.

2. The controlling method of claim 1, wherein, arrangement of coils of both the transmitting coil and a receiving coil use a are planar distributed winding arrangement, the winding is divided into two segments that are respectively wound and connected in series along a single path, and a sum of numbers of turns of the two segments is a total number of turns of the transmitting coil or a receiving coil.

3. The controlling method of claim 1, wherein, the step of adjusting a number of coil turns of the transmitting coil based on the positional relationship information, and adjusting conditions of a CT&C voltage gain and an input impedance after a charging inverter bridge of the wireless power transfer system to meet a charging condition so that the wireless power transfer system can charge an electric device comprises:
    reducing a phase angle of the input impedance after the charging inverter bridge of the wireless power transfer system to be zero, and making the CT&C voltage gain equal to a given gain.

4. The controlling method of claim 1, wherein, the step of adjusting a number of coil turns of the transmitting coil based on the positional relationship information comprises:
    judging whether the mapping relationship comprises the positional relationship information,
    if not comprising, gradually shorting the coil from outermost of the coil of the transmitting coil, and every time one turn of the coil is shorted, judging whether the conditions of the CT&C voltage gain and the input impedance after the charging inverter bridge of the wireless power transfer system meet the charging condition, and if the charging condition is met, completing the adjustment;
    recording the positional relationship information and the number of coil turns of the transmitting coil corresponding to the positional relationship information into the mapping relationship table.

5. The controlling method of claim 4, wherein, a difference between numbers of turns of two segments of the transmitting coil is 0 or 1.

6. The controlling method of claim 4, wherein, the method further comprises:
    if it is judged that the mapping relationship comprises the positional relationship information, and the number of coil turns of the transmitting coil corresponding to the obtained position relationship information can make the wireless power transfer system charge normally, directly adjusting the number of coil turns of the transmitting coil to be the number of coil turns of the transmitting coil corresponding to the positional relationship information based on the mapping relationship;
    if a mapping data device comprises the obtained positional relationship information, but the number of coil turns of the transmitting coil corresponding to the obtained positional relationship information cannot make the wireless power transfer system charge normally, giving up the charging.

7. A controlling device for a wireless power transfer system, wherein the wireless power transfer system comprises a transmitting coil and a receiving coil, and further comprises a contactless transformer & compensation circuit (CT&C), and the controlling device comprises: an auxiliary positioning device and a turn number adjusting device, wherein the turn number adjusting device is connected to the transmitting coil or receiving coil wherein:
    the auxiliary positioning device is configured to: determine a position of the receiving coil, obtain positional relationship information of the transmitting coil and the receiving coil, and sending the positional relationship information to the turn number adjusting device;
    the turn number adjusting device is configured to: receive the positional relationship information, adjust a number of coil turns of the transmitting coil based on the positional relationship information, and adjust conditions of a CT&C voltage gain characteristic and an input impedance after a charging inverter bridge of the wireless power transfer system to meet a charging condition so that the wireless power transfer system can charge an electric device;
    wherein the controlling device further comprises a mapping data device connected to the turn number adjusting device, wherein:
    the mapping data device is configured to: generate a mapping relationship between the number of coil turns of the transmitting coil and the positional relationship information of the transmitting coil and the receiving coil, and generate a mapping relationship table.

8. The controlling device of claim 7, wherein, the turn number adjusting device comprises a switching device.

9. The controlling device of claim 7, wherein, arrangement of coils of the transmitting coil and the receiving coil are planar distributed winding arrangement, the winding is divided into two segments that are respectively wound and connected in series along a single path, and a sum of numbers of turns of the two segments is a total number of turns of the transmitting coil or the receiving coil.

10. The controlling device of claim 7, wherein, the turn number adjusting device is further configured to:
reduce a phase angle of the input impedance after the charging inverter bridge of the wireless power transfer system to be zero, and making the CT&C voltage gain equal to a given gain.

11. The controlling device of claim 7, wherein, the turn number adjusting device comprises a processor executing:
judging whether the mapping data device comprises the positional relationship information, if not comprising, gradually shorting the coil from outermost of the coil of the transmitting coil, and every time one turn of the coil is shorted, judging whether the conditions of the a CT&C voltage gain and the input impedance after the charging inverter bridge of the wireless power transfer system meet the charging condition, and if the charging condition is met, completing the adjustment;
recording the positional relationship information and the number of coil turns of the transmitting coil corresponding to the positional relationship information into the mapping relationship table.

12. The controlling device of claim 11, wherein, a difference between numbers of turns of two segments of the transmitting coil is 0 or 1.

13. The controlling device of claim 11, wherein, the turn number adjusting device is further configured to:
if it is judged that the mapping relationship comprises the positional relationship information and the number of coil turns of the transmitting coil corresponding to the obtained position relationship information can make the wireless power transfer system charge normally, directly adjust the number of coil turns of the transmitting coil to be the number of coil turns of the transmitting coil corresponding to the positional relationship information based on the mapping relationship;
if the mapping data device comprises the obtained positional relationship information, but the number of coil turns of the transmitting coil corresponding to the obtained positional relationship information cannot make the wireless power transfer system charge normally, give up the charging.

* * * * *